March 3, 1964  R. B. KOCH  3,122,921

CONDITION RESPONSIVE DEVICES

Filed July 13, 1961

INVENTOR.
ROBERT B. KOCH
BY Robert O. Vidas

ATTORNEY

3,122,921
CONDITION RESPONSIVE DEVICES
Robert B. Koch, Hopkins City, Minn., assignor to Minneapolis-Honeywell Regulator Company, Minneapolis, Minn., a corporation of Delaware
Filed July 13, 1961, Ser. No. 123,682
7 Claims. (Cl. 73—358)

The present invention is directed to an indicator for use in indicating whether an article has gone through a freezing and thawing cycle. That is, the present invention is useful as an indicator for revealing that an article has been frozen, or for indicating that a substance once frozen has at some period in its life been thawed.

The need for such an indicator is present in many areas. As an example of a use for the device of the present invention as a freeze indicator, there is blood storage or the storage of certain drugs and foods which are adversely affected by freezing. An indicator is needed which will irreversibly indicate that these substances have been frozen.

As an example of the use of the present invention as a thaw indicator, there is the frozen foods industry. As is well known, most foods lose quality if they are frozen, thawed and then refrozen. The present invention provides a cheap, reliable and irreversible indication of the temperature history of an article insofar as its passing through a given temperature.

The device of the present invention may be most simply described as the use of the destruction of the gel structure of a silica gel by freezing as an irreversible temperature indication.

More particularly, the present invention utilizes two or more separate gelatin masses of different colors. On freezing, the gel structure is substantially destroyed so that on subsequent thawing the liquids which were formerly bound within the gel structure become mobile and blend to produce a color which is the product of the colors of the original gel masses.

Figure 1:
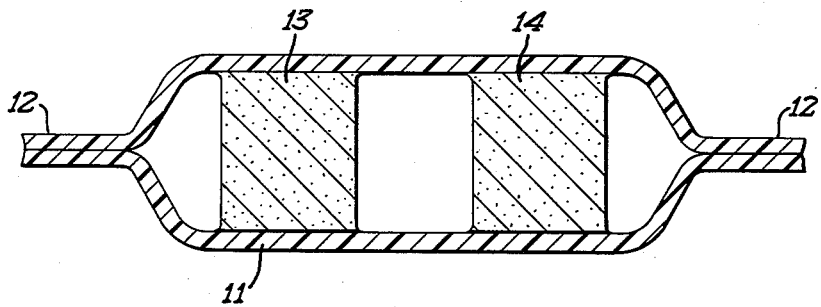

FIGURE 1 illustrates one physical form of the present invention. Eleven designates in cross-section a transparent tube of plastic or the like having sealed ends 12 which has been pressed together to form a vapor tight seal. Two or more silica gel masses 13 and 14 of different color are enclosed within the transparent tube 11. The color of the gel is determined by a dye dissolved in the liquid entrained in the gel.

The operation of the device is as follows. If gel mass 13 contains a blue colored liquid and if gel mass 14 contains a yellow colored liquid, a blending of these two liquids would produce a mixture of a generally green color. Unless the gel masses are frozen, the interstitial liquid will be retained within the gel structure. However, upon freezing the gel structure is substantially destroyed. On subsequent thawing the interstitial liquids are released and are thus free to intermingle to produce their resultant color. Even though the combined liquids are refrozen, it will be immediately visually apparent that a freezing and thawing cycle has occurred.

Figure 2:
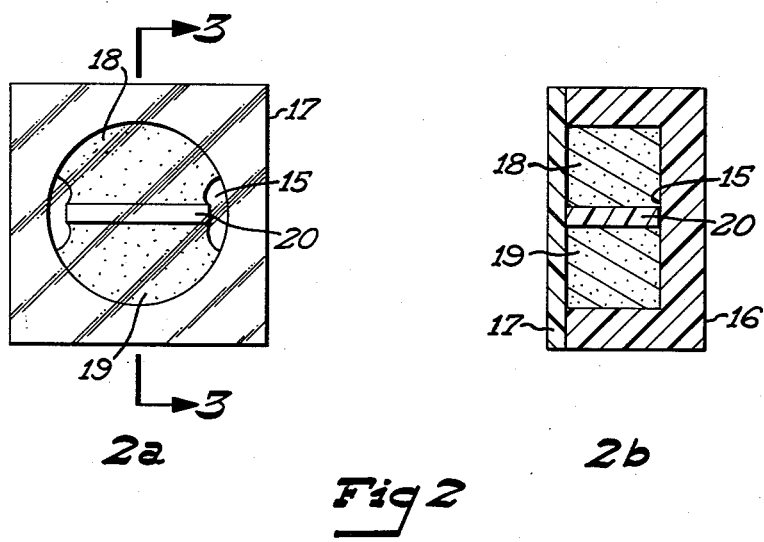

FIGURES 2a and sectional view 2b illustrate a second form of the invention. Here a cavity 15 within a case 16 which is covered by a transparent lid 17 is used to contain the differently colored gel masses 18 and 19. I have found it advantageous to utilize a "floating" or free divider 20 to separate the two gel masses. A fixed divider may also be used although more reliable mixing of the liquids resulting from freezing and thawing of the gel masses is obtained if the divider is "floating" or free. Operation of this configuration is the same as that previously described.

Various materials may be used to form the container to hold the gel masses. In this regard, glass is an excellent container although a number of transparent plastic materials are more readily fabricated and are less susceptible to fracture in handling. The principal requirements are that the container does not react with the gel or the contained liquid, and that the container material be assentially impervious to prevent volatilization of the liquid entrained within the gel.

Various gel materials may be used to form the gel masses such as 13 and 14. However, I have found that a silica gel is particularly useful in that it is not subject to bacterial, enzyme or fungus attack problems as are other gel materials. The use of silica gel will thus obviate the need for sterilization of the materials used in the invention.

Various means may be used to prepare the gel masses, and various ingredients may be used to vary the color and freezing point of the gel masses. The following example will illustrate a preferred form of the invention.

Example I

A mixture of commercial sodium silicate ($SiO_2/Na_2O = 3.25$; density 40–42° Bé.)

and water is prepared where the sodium silicate comprises from 6 to 8 percent by volume. Higher concentrations of sodium silicate may be used although the freezing point of the gel is depressed somewhat. A dye material is added to the water prior to blending with the sodium silicate. The dye may also be added during the blending of sodium silicate and the water. The dye used will depend on the color desired. As examples of usable dyes, the following listing illustrates in part those dyes which have proved satisfactory:

Alizarin yellow
Chicago blue
Brilliant yellow—used in red form
Malacite green
Thymol blue
Cresol red The concentration of dye will vary dependent on the intensity or depth of color desired. I have found that dye in the amount of 0.01 to 0.1 percent by weight suffices to give a pronounced color.

To the above mixture of sodium silicate, water and dye is added a quantity of concentrated (37% by weight) hydrochloric acid. The amount of hydrochloric acid should be equivalent to about 2 percent by volume. This quantity will vary somewhat in accordance with the sodium silicate concentration. The hydrochloric acid should be added with rapid stirring. Gelation occurs quite rapidly subsequent to agitation. The gel may be cast in appropriate thickness to allow sections to be cut for insertion in the container.

Example 2

The silica gel is prepared in the same manner as described above with the exception of the inclusion of a small quantity of silver iodide to the sodium silicate-water mixture prior to gelation with the hydrochloric acid. The silver iodide is added in quantities of approximately 10 milligrams per 1,000 ml. to the sodium silicate-water mixture. I have found that a pronounced tendency exists in the gel mass for supercooling of the liquid portion. That is, the water tends to supercool to below its freezing point, thus necessitating the use of lower temperatures to freeze and/or longer times at a given temperature for freezing. The addition of the silver iodide provides nuclei for crystallization to occur upon and thus reduces the tendency to supercool. Other materials than silver iodide may be used for this purpose. These will readily be apparent to those skilled in the art.

When it is desired to have a system which indicates a temperature other than that of the freezing point of the sodium silicate-water-hydrochloric acid mixture described hereinabove, this may be readily accomplished through use of alcohols, glycols, salts and the like to depress the freezing point of the mixture. Likewise, temperatures above the freezing point of this system may be achieved through use of a mixture of materials which will, upon freezing, rupture the gel structure.

A further type of indicator may be fashioned using the present invention. This is a multi-temperature indicator. For example, it is sometimes desirable to know whether a system has gone below a first temperature, yet not below a second lower temperature. This information can be readily obtained using the present invention by utilizing more than two masses of gel. For example, three masses of gel, A, B and C, of different colors can be placed within a single container. Gels A and B both freeze at a first temperature while C freezes at a second lower temperature. It is then obvious that if the temperature of the environment drops below the first temperature, but not below the second temperature, only gels A and B will have their cell structure destroyed. On subsequent thawing, gel C will remain unchanged while A and B will mix. If the second temperature or lower is achieved, all three gels will have their cell structure destroyed and on subsequent thawing A, B and C will all mix. Other variations of the present invention will be readily apparent to those skilled in the art.

I claim:

1. A device for indicating that a system has undergone a freezing and subsequent thawing comprising a sealed container having contained therein at least two masses of gel, said gels retaining therein respectively interstitial liquids of markedly different colors, said gels characterized in that the gel structure thereof is substantially destroyed by freezing so that upon subsequent thawing the interstitial liquids are released to commingle.

2. A device for indicating that a system has undergone a freezing and subsequent thawing comprising a sealed container having contained therein at least two masses of gel, said gels retaining therein respectively interstitial aqueous solutions of markedly different colors, said gels characterized in that the gel structure thereof is substantially destroyed by freezing so that upon subsequent thawing the interstitial liquids are released to commingle.

3. A device for indicating that a system has undergone a freezing and subsequent thawing comprising a sealed container having contained therein at least three masses of gel, said gels respectively retaining therein interstitial aqueous solutions of markedly different colors, said solutions characterized further in that one solution possesses a markedly lower freezing point than the melting point of the other solutions, said gels characterized in that the gel structure thereof is substantially destroyed by freezing so that upon subsequent thawing the interstitial liquids are released to commingle.

4. A device in accordance with claim 1 wherein the gel consists essentially of a mixture of from 6 to 8% by volume of sodium silicate, 2 percent by volume of concentrated hydrochloric acid, balance an aqueous solution of a predetermined freezing point.

5. A device in accordance with claim 4 further characterized in that the aqueous solution consists solely of water.

6. The method of arranging for an indication of exposure of an article to a temperature below a predetermined minimum comprising placing a container having retained therein at least two masses of silica gel having retained therein interstitial liquids of different colors into close proximity with said article, said gel masses freezing at said predetermined minimum, subsequent freezing of said gels substantially destroying the gel structure thereof whereby subsequent thawing results in a commingling of said liquids to provide a visual indication of the exposure of said article to temperatures below said predetermined minimum.

7. The method of arranging for an indication of exposure of an article to a temperature exceeding a predetermined temperature comprising placing a container having retained therein at least two masses of silica gel having retained therein differently colored interstitial liquids into close proximity with said article, said gels freezing at said predetermined minimum, freezing said gel to substantially destroy the gel structure thereof whereby exposure to a temperature above said predetermined temperature releases the liquids in said gel to permit them to commingle and produce a color change indicative of said thawing taking place.

References Cited in the file of this patent

UNITED STATES PATENTS

| | | |
|---|---|---|
| 2,662,018 | Smith | Dec. 8, 1953 |
| 2,892,798 | Dobbs et al. | June 30, 1959 |